United States Patent
Qi et al.

(10) Patent No.: US 8,238,481 B2
(45) Date of Patent: Aug. 7, 2012

(54) BLIND CHANNEL ESTIMATION FOR PSK AND D-PSK MODULATED MULTICARRIER COMMUNICATION SYSTEMS

(75) Inventors: Yihong Qi, Schaumburg, IL (US); Feng Huang, Hoffman Estates, IL (US); Azzedine Touzni, Algonquin, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1047 days.

(21) Appl. No.: 12/166,636

(22) Filed: Jul. 2, 2008

(65) Prior Publication Data
US 2010/0002783 A1    Jan. 7, 2010

(51) Int. Cl.
*H04L 27/22* (2006.01)
(52) U.S. Cl. .................... 375/329; 375/330
(58) Field of Classification Search ............. 375/229, 375/232, 260, 279, 283, 284, 296, 303, 323, 375/329, 330
See application file for complete search history.

(56) References Cited

U.S. PATENT DOCUMENTS

| | | | |
|---|---|---|---|
| 6,307,903 B1 * | 10/2001 | Harris et al. | 375/350 |
| 6,608,863 B1 * | 8/2003 | Onizawa et al. | 375/325 |
| 6,636,561 B1 * | 10/2003 | Hudson | 375/260 |
| 7,221,699 B1 * | 5/2007 | Lindskog | 375/340 |
| 7,224,725 B2 | 5/2007 | Kim | |
| 7,433,428 B2 | 10/2008 | Blasco Claret et al. | |
| 2006/0088112 A1 * | 4/2006 | Das et al. | 375/260 |
| 2006/0198452 A1 * | 9/2006 | Dibiaso et al. | 375/260 |
| 2007/0242760 A1 * | 10/2007 | Hsiung et al. | 375/260 |
| 2009/0092203 A1 * | 4/2009 | Yu | 375/296 |

OTHER PUBLICATIONS

Chotikakamthorn, et al., "On identifiability of OFDM blind channel estimation," Proceeding of VTC 1999-Fall, Amsterdam, Netherlands 4:2358-2361 (Sep. 1999).
Muquet et al., "Blind and semi-blind channel identification methods using second order statistics for OFDM systems," Proceeding of IEEE ICASSP, 5:2745-2748 (1999).
Zhou, S. et al., "Finite-alphabet based channel estimation for OFDM and related multicarrier system," *IEEE Transactions on Communications*, 49(8):1402-1414 (2001).
Roy, S. et al., "A subspace blind channel estimation method for OFDM systems without cyclic prefix," *IEEE Transactions on Wireless Communications*, 1 (4): 572-579 (2002).
Li, C. et al., "Subspace-based blind channel estimation for OFDM by exploiting virtual carriers," *IEEE Transactions on Wireless Communications*, 2(I):141-150 (2003).
Necker, M. C. et al., "Totally blind channel estimation for OFDM on fast varying mobile radio channels," *IEEE Transactions on Wireless Communications*, 3(5)1514-1525 (2004).
Gao, F. et al., "Blind channel estimation for OFDM systems via a generalized precoding," *IEEE Transactions on Vehicular Technology*, 56(3):1155-1164 (2007).

* cited by examiner

*Primary Examiner* — Sam K Ahn
*Assistant Examiner* — Janice Tieu
(74) *Attorney, Agent, or Firm* — Charles Chesney (57) ABSTRACT

An apparatus and method is described that provide an efficient blind channel estimation approach for PSK and DPSK modulated multicarrier communication systems. With the requirement that the channel phase difference between any two adjacent carriers is smaller than one half of the minimum phase difference between two symbols of the PSK or DPSK constellation, a low-complexity deterministic approach to channel estimation is devised. This approach is highly effective, robust, and particularly useful for time varying channels with low AWGN noise.

37 Claims, 5 Drawing Sheets

BLIND CHANNEL ESTIMATION FOR PSK AND D-PSK MODULATED MULTICARRIER COMMUNICATION SYSTEMS

BACKGROUND OF THE INVENTION

1. Field of the Invention

The present invention relates to a method and apparatus for blind channel estimation for phase shift keying (PSK) and differential PSK (D-PSK) modulated multicarrier communication systems.

2. Background Art

The need for high speed robust communications systems has grown dramatically in recent years. Such a demand has been fueled by the need to support various communications market segments, e.g., ever increasing numbers of voice calls, higher information transfer rates, and better connectivity to the Internet. Both consumer and business market segments have witnessed unparalleled increases in growth, and such growth is predicted to continue for the foreseeable future. In theory, communications systems could accommodate the demand for increased data throughput by securing additional bandwidth for communication. However, bandwidth is a limited resource and in most cases is limited by regulation. Accordingly, communication system designers have sought to extract greater data throughput from existing bandwidth, either by using more efficient modulation schemes, or by overcoming practical limitations posed by the communications environment, e.g. the communications channel.

One difficulty with many communications systems is that the communications channel itself introduces amplitude and phase distortion into the transmitted signal. In order to improve the performance of a given communications system, it is necessary to remove the amplitude and phase distortion introduced by the communications channel. Accordingly, in order to remove the deleterious effects of the channel distortion, it is necessary to develop an estimate of the amplitude and phase distortion components introduced by the communications channel. Such an estimation process is called channel estimation.

Typically, channel estimation is performed using one of a variety of methods. While there are many differences between the various channel estimation methods available, many of these differences can be reduced to the fundamental tradeoff made between the complexity of the method and the performance of that method. Conceptually, outstanding channel estimation performance can be achieved, albeit at the expense of inordinately complex methods. In some cases, the complexity of such methods may be such that those methods cannot be reasonably implemented in practical communications systems.

In one traditional approach, known pilot symbols are transmitted such that the communications channel can be calibrated by the receiver. Pilot symbols are reference symbols that are known a priori by both the transmitter and the receiver such that a calibration process may be implemented. Upon receipt of the transmitted pilot symbols, this channel estimation algorithm analyses the received pilot symbols in order to generate an estimate of the distortion introduced by the communications channel.

An alternative channel estimation approach does not rely on the transmission of pilot symbols that are known a priori, but instead relies on certain known properties of the regular data signals transmitted by the communications system transmitter. For example, modulation schemes that use phase shift keying (PSK) techniques rely on changes in phase of the signal carrier to capture the information required to be communicated. Accordingly, since the amplitude of the PSK-modulated signal is unaltered, the transmitted signal maintains a predictably fixed energy level. As such, channel estimation algorithms can be designed to capitalize on such known properties of the transmitted signal; in the case of PSK modulation communication systems, those known properties are the discrete signal phases and uniform signal amplitude. Channel estimation techniques that do not use pilot symbols in the channel estimation process but rely on known properties of the transmitted data signal are often referred to as "blind" channel estimation techniques.

Most existing blind channel estimation methods are based on second or higher order statistics, or the maximum likelihood (ML) principle. Selected references from the literature are listed as follows: B. Muquet and M. de Courville, "Blind and semi-blind channel identification methods using second order statistics for OFDM systems," Proceeding of IEEE ICASSP 1999, vol. 5, pp. 2745-2748; C. Li and S. Roy, "Subspace-based blind channel estimation for OFDM by exploiting virtual carriers," IEEE Transactions on Wireless Communications, vol. 2, no. 1, January 2003, pp. 141-150; N. Chotikakamthorn and H. Suzuki, "On indentifiability of OFDM blind channel estimation," Proceeding of VTC 1999-Fall, Amsterdam, Netherlands, vol. 4, September 1999, pp. 2358-2361. A major drawback of these methods is the huge computational complexity and requirement of a large amount of received data, which make these methods not suitable to be implemented in practical systems. Such difficulties are exacerbated when the communications channel varies rapidly over time, since the amount of received data subject to similar channel conditions is very limited, and may not be sufficient to support a conventional blind channel estimation method.

What is needed is a blind channel estimation technique that provides a better trade-off between complexity and performance such that a practical implementation can be achieved, especially in the circumstances of a time-varying communication channel.

BRIEF SUMMARY OF THE INVENTION

Embodiments of the current invention provide a practical approach to blind channel estimation using a technique that is robust, of modest complexity, and is particularly effective with a time-varying channel. Unlike the traditional blind channel estimation approaches that rely on statistical techniques requiring large amounts of data collection and substantial numerical computations, embodiments of the current invention use a deterministic and low-complexity approach. This approach takes advantage of the characteristics of phase shift keying (PSK) modulation techniques (including differential PSK modulation techniques) which are commonly used in modern wireless communications systems.

In accordance with an embodiment of the current invention, coarse channel estimation is determined by making use of the fact that the channel phase difference of two adjacent carriers is usually much smaller than the minimum phase difference of two symbols in a PSK or a D-PSK modulation constellation. Subsequently and optionally, refined channel estimation may be determined by reducing the noise distortion present in the coarse channel estimation. In one embodiment of the current invention, noise distortion reduction is achieved by the use of a low-pass filter. In another embodiment of the current invention, noise distortion reduction is achieved through the use of a minimum mean square error (MMSE) filter.

This novel approach offers the following four advantages. Firstly, this approach needs only a small amount of received data (e.g. one symbol in an orthogonal frequency division multiplexing (OFDM) communications system), and thereby avoids the traditional need for large amounts of data. Accordingly, this approach is particularly applicable to channel estimation in fast time-varying channels. Secondly, the method has low computational complexity that scales linearly with the number of data samples used, and which thereby facilitates practical implementation. Thirdly, since this is a blind estimation approach (i.e. pilot symbols are not needed), this approach can directly be applied to several existing communications standards that do not provide sufficient pilots for traditional channel estimation (e.g. Integrated Service Digital Broadcasting-Terrestrial (ISDB-T)). Finally, the method significantly improves communications system performance in differential PSK (D-PSK) modulation systems when used in a fast time-varying communications channel with low additive white Gaussian noise (AWGN). For example, the application of an embodiment of the current invention to the DQPSK mode of an ISDB-T communications system can operate properly in a clean time-varying channel with Doppler frequency shifts of up to several hundred Hertz.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
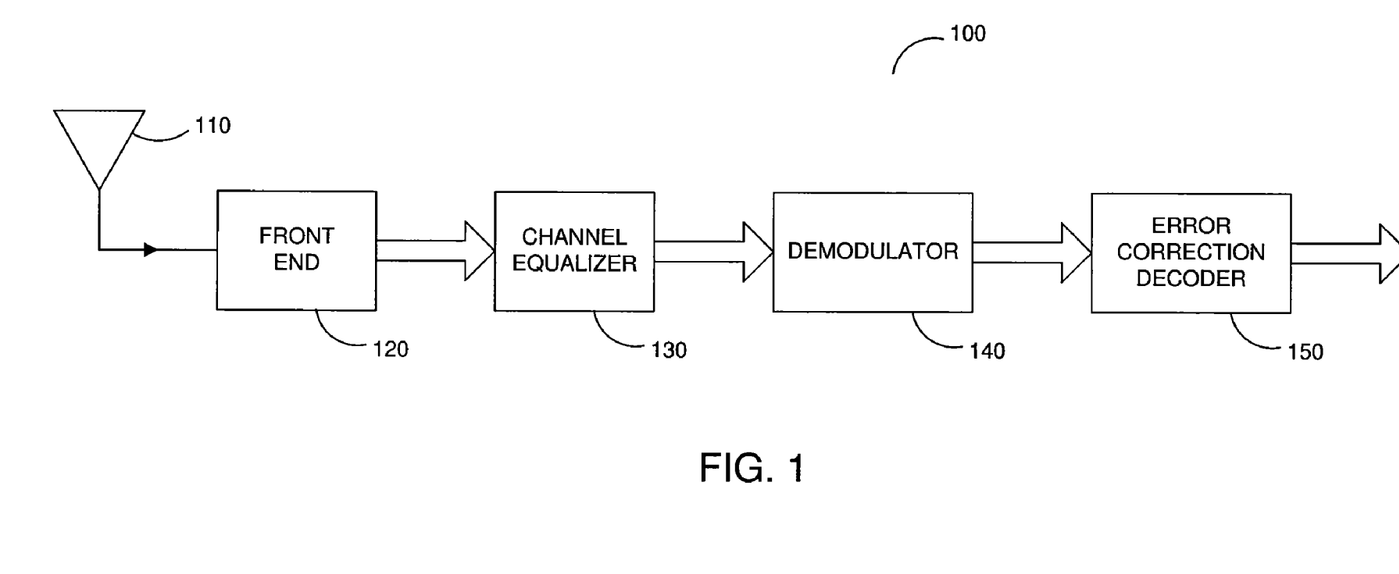
FIG. 1 is a block diagram of a receiver in a communication system in which an embodiment of the present invention is employed.

FIG. 1 is an illustration of a receiver in a communication system to which embodiments of the current invention may be employed. A typical communications receiver 100 comprises an antenna 110, a front end 120, a channel equalizer 130, a demodulator 140, and an error correction decoder 150. A communications signal that has passed through a communications channel from transmitter to receiver is captured by the antenna 110, and is turn coupled to the receiver's front-end 120. The front-end 120 provides one or more of the following functionalities: gain, down-conversion, filtering, and digitization. In addition, it may provide fast Fourier transform functionality. The front-end 120 is in turn coupled to the channel equalizer 130. The channel equalizer 130 operates to reverse the effects of the channel distortion. The demodulator 140, coupled to channel equalizer 130, demodulates the signal to retrieve the underlying information content from the signal. Finally, the demodulator 140 is coupled to the error correction decoder 150, which is in turn coupled to the output of the receiver. The error correction decoder 150 reverses the functionality of its corresponding encoder in the transmitter.

Embodiments of the current invention are realized within the channel equalizer 130. The approach described herein can be applied to any communications receiver using a modulation scheme where the amplitude of the symbols is constant and the symbols are equally spaced in phase, e.g. any Phase Shift Keying (PSK) type modulation, and any differential PSK (D-PSK) type modulation. For discussion purposes below, and without loss of generality, a differential quadrature phase shift keying (DQPSK) modulation system is used as an example of the underlying principles of this channel estimation technique. In particular, and again without limiting the scope of this approach, the channel estimation discussion will be based on the samples of received DQPSK modulated symbols on multiple carriers in an OFDM communications system.

Figure 2A:
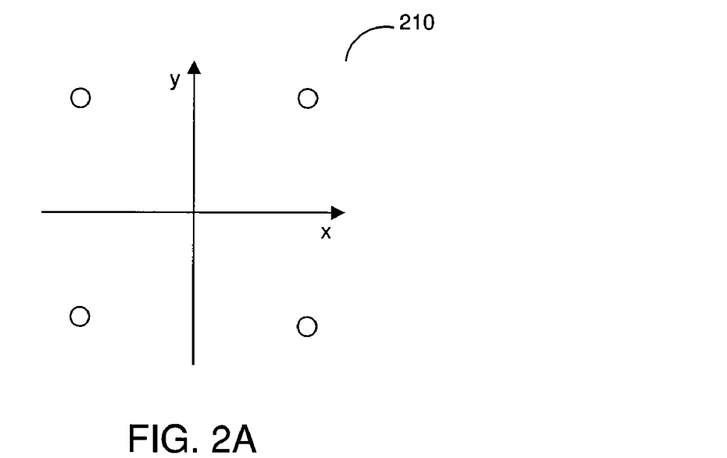
FIG. 2A is a constellation diagram pertaining to a DQPSK modulation scheme.
Figure 2B:
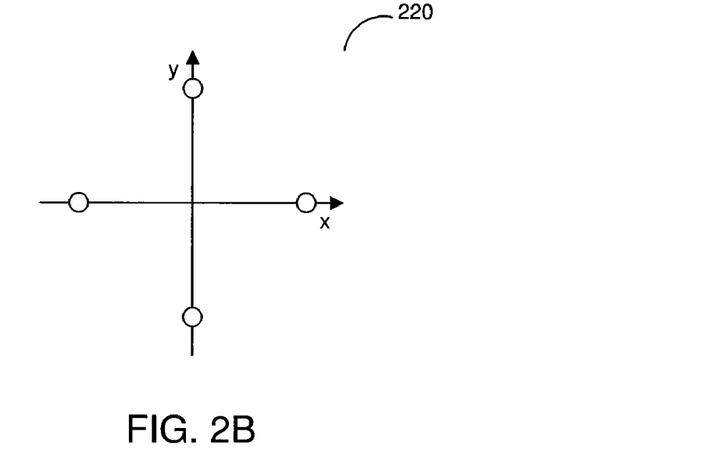
FIG. 2B is another constellation diagram pertaining to a DQPSK modulation scheme.
Figure 2C:
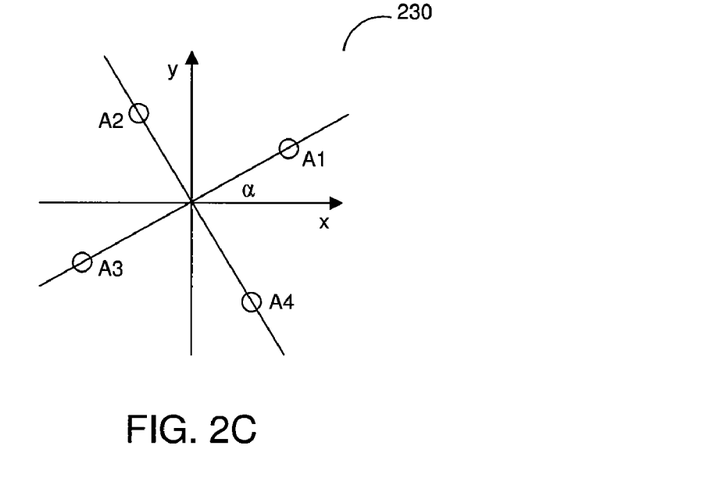
FIG. 2C is a constellation diagram pertaining to a DQPSK modulation scheme, where the distortion introduced by a communications channel is shown.

In such a DQPSK modulated OFDM receiver system, let $r_1, r_2, \ldots, r_N$ be the received data symbols on the N carriers, where the received data symbols have been subject to channel distortion and noise. In an "ideal world", a DQPSK symbol can take one of the values of the constellations ($e^{j\pi/4}, e^{j3\pi/4}, e^{-j3\pi/4}, e^{-j\pi/4}$) or ($e^{j\pi/2}, -1, e^{-j\pi/2}, 1$), corresponding to the first and second constellations as shown in FIG. 2A and FIG. 2B, respectively. In either case, the minimum phase difference between two symbols in these constellations is $\pi/2$. For simplicity and without loss of generality, only the second constellation ($e^{j\pi/2}, -1, e^{-j\pi/2}, 1$) is considered here. However, when "real world" channel distortion $He^{j\theta}$ is taken into account, the constellation of received symbols is changed to $He^{j\theta}(e^{j\pi/2}, -1, e^{-j\pi/2}, 1)$, which are represented by ($A_1, A_2, A_3, A_4$), as shown in the third constellation in FIG. 2C. For many practical wireless and wired communication channels, the channel phase difference of two adjacent carriers is smaller than one-half of the minimum phase difference between two symbols in a PSK or a D-PSK constellation. In the specific example of a DQPSK modulation system, the channel phase difference of two adjacent carriers needs to be smaller than $\pi/4$. The method described below is predicated on this relationship.

Using the N received symbol samples $\{r_i, i=1, 2, \ldots, N\}$ on N carriers, channel amplitude estimation and channel phase estimation may be accomplished. In a PSK-type or a D-PSK type modulation receiver system, amplitude estimation is rather straightforward, since these types of modulation schemes use a constant amplitude for all symbols. Therefore, any amplitude variation in a received symbol reflects the effects of channel amplitude distortion. Mathematically, such an effect may be stated as follows:

$$\hat{H}_i = \text{abs}(r_i), \text{ for } i=1,2\ldots,N, \quad (1)$$

where $H_i$ is the channel amplitude estimate on the i-th carrier, and abs(a) is the absolute value of the complex value a.

While the channel amplitude estimation is straightforward, the channel phase estimation is more complex, and proceeds as follows. Channel phase estimation is conducted based on the set of phase differences between any two adjacent carriers. If there were no channel phase distortion, the phase difference of data symbols on two adjacent carriers should be one of the four values in the set $(0, \pi/2, -\pi/2, \pi)$. Given the assumption that channel phase does not vary dramatically between adjacent carriers such that the channel phase difference is less than $\pi/4$, the channel phase difference between the i-th and (i−1)-th carriers can be approximated as follows:

$$\delta\hat{\theta}_i = \alpha_i - \beta_m, \text{ for } i=2,3\ldots,N, \quad (2)$$

where $$\alpha_i = \angle(r^*_{i-1} \cdot r_i) \quad (3)$$

is the phase difference between the $r_{i-1}$ and $r_i$ symbol samples, $$m = \underset{n}{\text{argmin}}(|\alpha_i - \beta_n|), \quad (4)$$

is the value of the specific n that minimizes the absolute difference between the two angles $\alpha_i$ and $\beta_n$, where $\beta_n$ takes each of the values in the set $(0, \pi/2, \pi, -\pi/2)$. In equation (3), the superscript "*" stands for "complex conjugate".

Next, an estimate of the channel phase of a carrier carrying a reference symbol may be made. Without loss of generality, the first carrier may be assumed to carry a known reference symbol p. Hence, the channel phase of that reference symbol may be determined as follows:

$$\hat{\theta}_1 = \angle(p^* \cdot r_1) \quad (5)$$

In the next step, the channel phases for all N carriers are successively reconstructed, as follows:

$$\hat{\theta}_i = \hat{\theta}_1 + \sum_{n=2}^{i} \delta\hat{\theta}_n, \text{ for } i = 2,3,\ldots,N. \quad (6)$$

Given that the channel amplitude estimates and the channel phase amplitudes are available for all N carriers, coarse channel estimates for all N carrier frequencies may now be determined, as follows:

$$\hat{C}_i = \hat{H}_i \cdot e^{j\hat{\theta}_i}, \text{ for } i=1,2,\ldots,N. \quad (7)$$

Finally, and optionally, refined channel estimates may be determined by removed the noise induced errors that may be included into the coarse channel estimates. Here, filtering, denoted by F below, may be used to remove a substantial portion of such noise induced errors, as follows:

$$\tilde{C} = F \otimes \hat{C}, \quad (8)$$

where $\otimes$ represents "convolution".

The filters may be any filter appropriate for the reduction of noise in the coarse estimates, including but not limited to a low pass filter (LPF), or a minimum mean square error (MMSE) filter.

One example of where an embodiment of the current invention may be utilized is the DQPSK mode of the Integrated Services Digital Broadcasting-Terrestrial (ISDB-T) standard compliant receiving system. ISDB-T is a Japanese digital television standard that regulates the transmission of a high-definition television channel and a mobile phone channel within a 6 MHz bandwidth that had been reserved originally for television transmissions. Multiple modulation techniques are specified within this standard, including DQPSK-OFDM. Other communications standards that employ PSK modulated multicarrier techniques and are therefore particularly suited to benefit from an application of this invention, include the following. The Digital Audio Broadcasting (DAB) standard (also known as Eureka 147), regulates a digital technology for broadcasting radio stations, particularly in Europe. The Digital Multimedia Broadcasting (DMB) standard is a digital radio transmission system for sending multimedia (radio, TV, and datacasting) to mobile devices such as mobile phones. The DMB standard is available in two forms, namely the satellite version (S-DMB) and the terrestrial version (T-DMB). The HomePlug 1.0 standard is a home networking technology standard that connects devices to each other through the power lines in a home. Devices that can be connected using the HomePlug 1.0 standard include PCs, Macs, and other devices that use Ethernet, USB, and IEEE 802.11 connectivity standards. Finally, the Brazilian Digital Television System standard (SBTVD), a digital television standard for Brazil based on ISDB-T, is also able to benefit from an application of various embodiments of this invention. Note that this list is not exhaustive set of standards, but are merely provided as examples of the wide application for which embodiments of the invention may be found to thrive.

Figure 3:
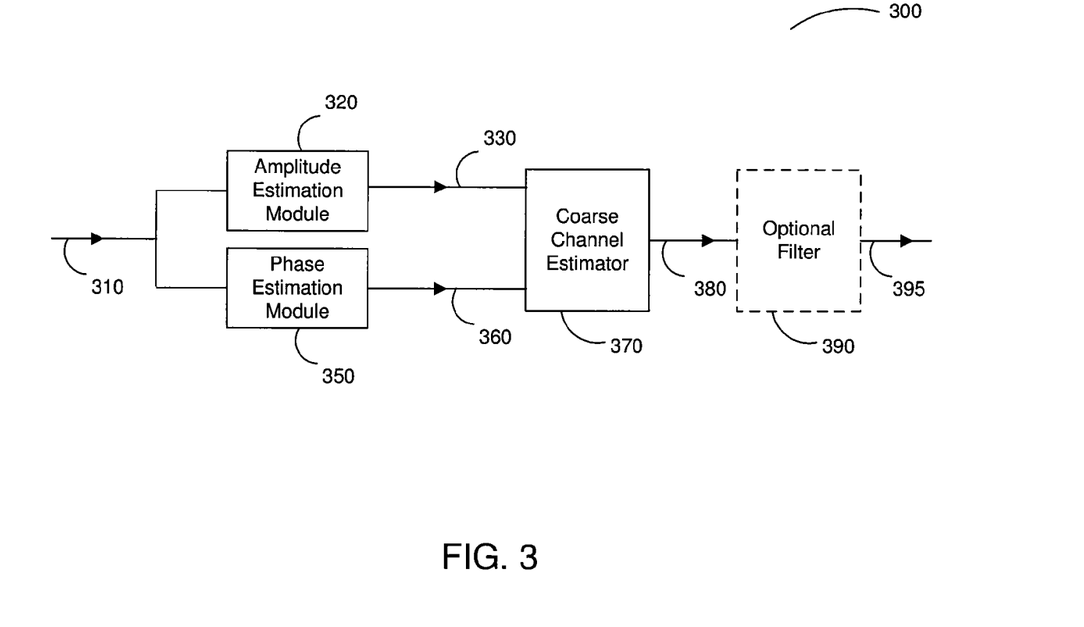
FIG. 3 is a block diagram of an embodiment of the current invention for blind channel for PSK and D-PSK modulated multicarrier communications systems.

FIG. 3 is a block diagram of an embodiment of an apparatus for blind estimation of the distortion of a communications channel. Incoming symbols 310 are fed to the amplitude estimation module 320 and the phase estimation module 350. The amplitude estimation module 320 outputs a channel amplitude estimate output 330 using the amplitude component of each of the incoming symbols 310, in accordance with equation (1) above. The phase estimation module 350 performs operations on the incoming symbols 310 in accordance with equations (2) through (6) above, and outputs the channel phase estimate 360. Coupled to the channel phase estimate output 360 and the channel amplitude estimate output 330 is the coarse channel estimator 370. The coarse channel estimator 370 re-constructs, in accordance with equation (7) above, a coarse channel estimate 380 using the channel amplitude estimate output 330 and the channel phase estimate output 360. Optionally, the coarse channel estimate 380 may be filtered using an optional filter 390, which in turn outputs a fine channel estimate 395. The boundaries of these functional blocks are arbitrary, and alternate boundaries fall within the scope of this approach so long as the specified functions and relationships satisfy, or are equivalent, to that described above.

Note that these functional blocks, or their equivalents, can be implemented in hardware, software, firmware, or a combination thereof. If implemented in firmware, such functionality can be stored in a memory (e.g., PROM) and executed by a digital signal processor (DSP) or a general purpose microprocessor. If implemented in hardware, such hardware can include one or more of the following: discrete logic circuitry, application specific integrated circuits (ASICs), programmable gate arrays (PGAs), and field programmable gate arrays (FPGAs).

Figure 4:
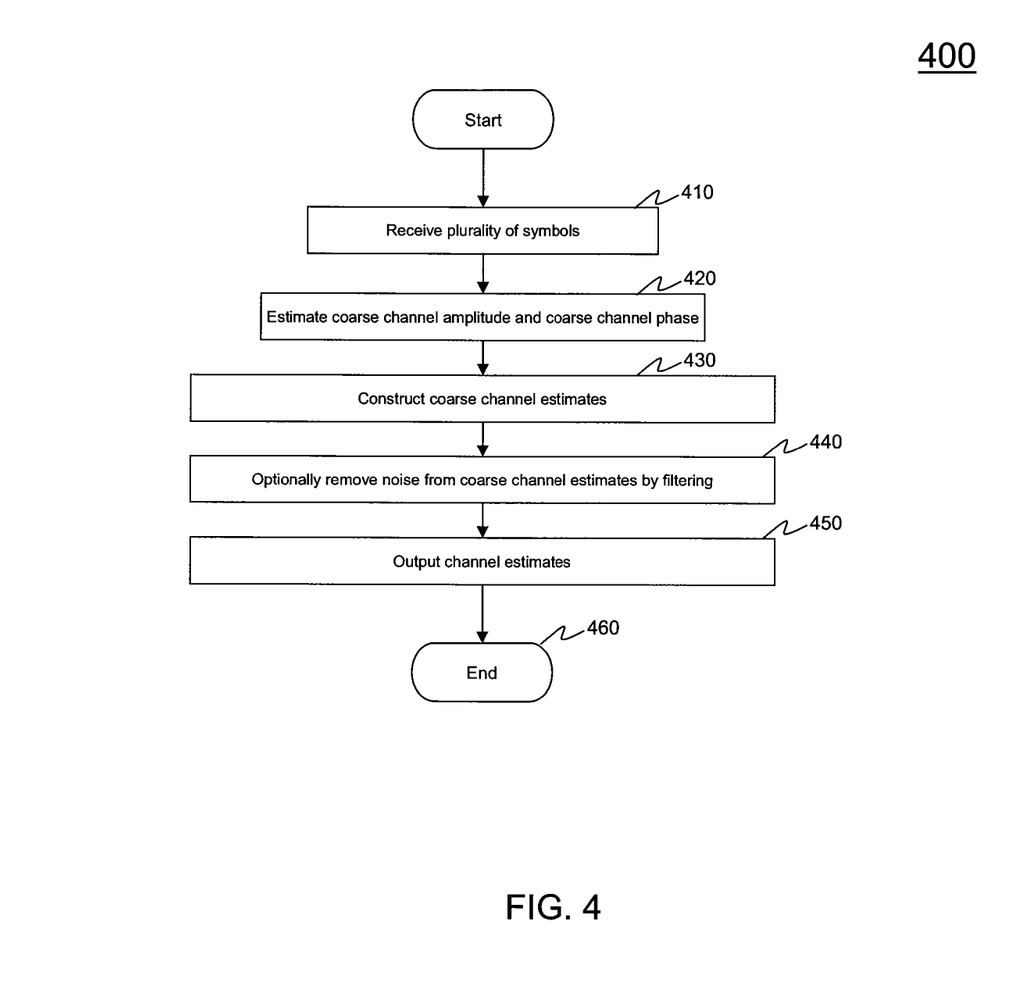
FIG. 4 is a flow chart of an embodiment of the current invention for blind channel estimation in a DQPSK modulated multicarrier communications system.

FIG. 4 is a flow chart of an embodiment of a method 400 for blind estimation of the distortion of a communications channel. In method 400, at a step 410, the received N symbol data on the N carriers are input to the channel estimator. At a step 420, based on the N symbols from the N carriers, coarse estimations are made of the amplitude component and of the phase component of the channel distortion on each carrier. At a step 430, construction of the coarse channel estimates is made using the amplitude and phase component estimates of each carrier. Optionally, at a step 440, the coarse channel estimates are filtered using an appropriate filter to remove the noise contributions in the coarse channel estimates. At a step 450, the channel estimates are output for subsequent use in the communications receiver. Finally, at a step 460, the method ends.

Figure 5:
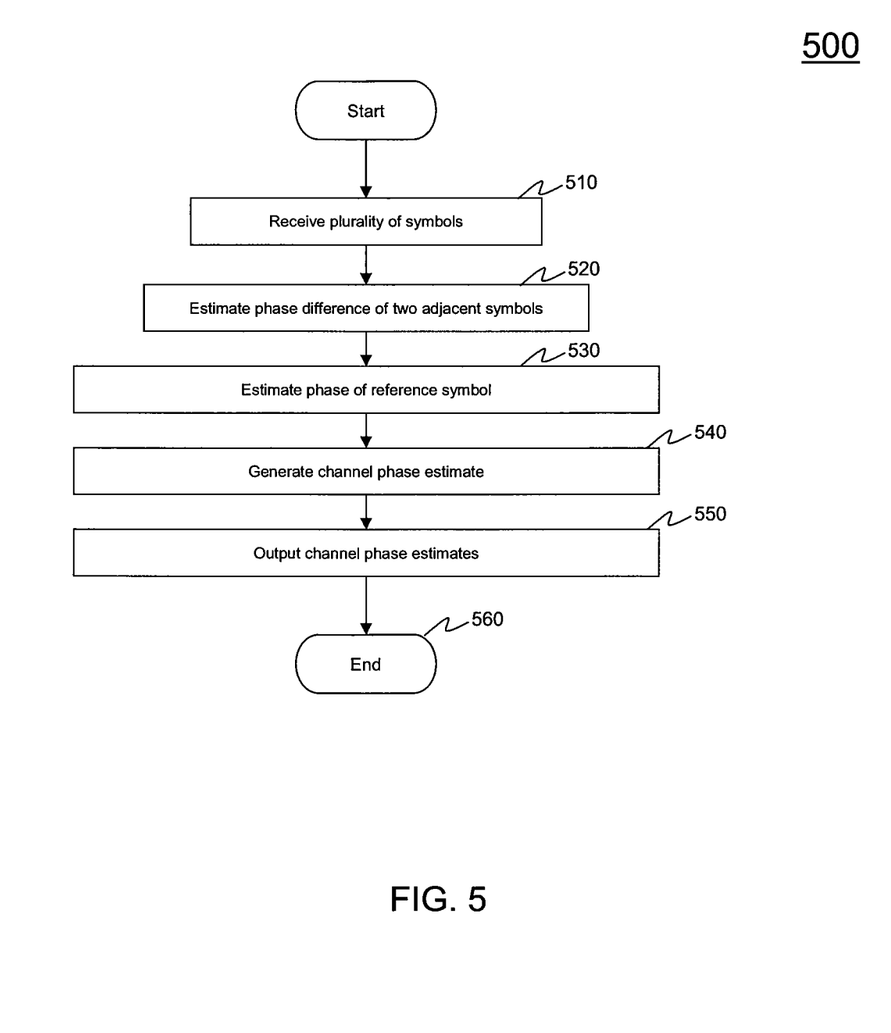
FIG. 5 is a flow chart of an embodiment of the current invention for blind estimation of the channel phase component in a DQPSK modulated multicarrier communications system.

FIG. 5 is a flow chart of an embodiment of a method 500 for blind estimation of the phase component of the distortion of a communications channel. In method 500, at a step 510, the received symbol data on the N carriers is input to the channel phase estimator. At a step 520, estimations are made of the channel phase difference between any two adjacent carriers. Such an estimation is performed for each of the carriers, 2 through N. At a step 530, an estimation is made of the channel phase of the carrier carrying a reference symbol, i.e. the channel phase of the initial carrier. At a step 540, reconstruction of each of the channel phase estimates is made for each of the carriers, 2 through N. At a step 550, the estimates of the channel phases on N carriers are output. Finally, at a step 560, the method ends.

The approach taken by this invention is able to conduct channel estimation using only one set of symbols on N carriers, and can therefore operate in a fast time-varying channel. For example, in the DQPSK mode of an ISDB-T compliant system with a central carrier frequency of 666 MHz, channel estimation using an embodiment of this invention can function properly in a time-varying channel with Doppler frequency shifts of up to several hundred Hertz, which is equivalent to the communications receiver moving at speeds in excess of 100 miles per hour.

Even though the embodiment examples described herein have been related to DQPSK, this approach is not limited to DQPSK modulated multicarrier communication systems. Because the approach described herein relies on phase differences between adjacent symbols, it is equally applicable to QPSK modulated multicarrier communication systems. Moreover, this approach is also applicable to any n-PSK or n-DPSK communication systems where the channel phase difference of two adjacent carriers is smaller than one-half the minimum phase difference between two symbols, namely one-half of $2\pi$ divided by n. In n-PSK and n-DPSK communication systems, the angular separation of symbols in the constellation, denoted by phi, is equal to $2\pi$ divided by n. In these communication systems, the set of values taken by $\beta_n$ in equation (4) above are those values, beginning at 0 and incrementing around the unit circle at intervals of $2\pi$ divided by n. With respect to multicarriers, this approach is not limited to communication systems that utilize an OFDM technique. Rather, all PSK or D-PSK modulated multicarrier communication systems fall within the scope of the current invention.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It should be noted that the simulation, synthesis and/or manufacture of the various embodiments of this invention may be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A receiver apparatus for blind channel estimation, comprising:
   a channel amplitude estimation circuit adapted to receive a plurality of PSK (phase shift keying) or DPSK (differential phase shift keying) modulated symbols, with each received symbol characterized by an amplitude component, a phase component and associated with a carrier, and wherein said channel amplitude estimation circuit is configured to output a channel amplitude estimate for each carrier based on the amplitude component of the associated received symbol;
   a channel phase estimation circuit adapted to receive the same plurality of PSK or DPSK modulated symbols received by said channel amplitude estimation circuit, and wherein said channel phase estimation circuit is configured to output a channel phase estimate for each carrier based on the differences between phase components of received symbols associated with adjacent carriers and on a minimum phase difference between any two PSK or DPSK symbols; and a coarse channel estimator coupled to said channel phase estimation circuit and coupled to said channel amplitude estimation circuit, and adapted to output a coarse channel estimate associated with each carrier, wherein the amplitude of the coarse channel estimate equals the channel amplitude estimate for the carrier, and the phase of the coarse channel estimate equals the channel phase estimate for the carrier.

2. The apparatus of claim 1, further comprising:
a filter coupled to the coarse channel estimator and adapted to filter the coarse channel estimates to output fine channel estimates.

3. The apparatus of claim 2, wherein the filter is a low pass filter.

4. The apparatus of claim 2, wherein the filter is a minimum mean square error filter.

5. The apparatus of claim 1, wherein the plurality of symbols received are associated with an orthogonal frequency division multiplexing (OFDM) system.

6. The apparatus of claim 1, wherein the plurality of symbols received are DQPSK symbols associated with at least one of an Integrated Service Digital Broadcasting-Terrestrial (ISDB-T) compliant system, a Digital Audio Broadcasting (DAB) compliant system, a Digital Multimedia Broadcasting (DMB) compliant system, a HomePlug compliant system, and a Brazilian Digital Television System (SBTVD) compliant system.

7. The apparatus of claim 1, wherein the plurality of symbols received are transmitted over a channel characterized by a Doppler shift.

8. A method of blind channel estimation, comprising:
receiving a plurality of symbols, wherein each received symbol is associated with a carrier, each received symbol is further associated with a symbol constellation featuring symbol states of constant amplitude and equal phase separation of phi, and wherein each received symbol is characterized by an amplitude component and a phase component;
determining a channel amplitude estimate for each carrier based on the amplitude component of the associated received symbol;
determining a channel phase estimate for each carrier based on the differences between phase components of received symbols associated with adjacent carriers and on a minimum phase difference between any two symbols; and
determining a coarse channel estimate for each carrier, wherein the amplitude of the coarse channel estimate equals the channel phase amplitude estimate for the carrier, and the phase of the coarse channel estimate equals the channel phase estimate for the carrier.

9. The method of claim 8, further comprising:
filtering a coarse channel estimate to create a fine channel estimate.

10. The method of claim 9, wherein the filtering includes using a low pass filter.

11. The method of claim 9, wherein the filtering includes using a minimum mean square error filter.

12. The method of claim 8, wherein the symbol constellation is a quadrature phase shift keying (QPSK) symbol constellation and phi equals pi divided by 2.

13. The method of claim 8, wherein the symbol constellation is a differential quadrature phase shift keying (DQPSK) symbol constellation and phi equals pi divided by 2.

14. The method of claim 8, wherein the symbol constellation is a binary phase shift keying (BPSK) symbol constellation and phi equals pi.

15. The method of claim 8, wherein the symbol constellation is a n-PSK (phase shift keying) symbol constellation and phi equals 2 times pi divided by n.

16. The method of claim 8, wherein the symbol constellation is a n-DPSK (differential phase shift keying) symbol constellation and phi equals 2 times pi divided by n.

17. The method of claim 8, wherein the plurality of symbols received are associated with an orthogonal frequency division multiplexing (OFDM) system.

18. The method of claim 8, wherein the plurality of symbols received are DQPSK symbols associated with at least one of an Integrated Service Digital Broadcasting-Terrestrial (ISDB-T) compliant system, a Digital Audio Broadcasting (DAB) compliant system, a Digital Multimedia Broadcasting (DMB) compliant system, a HomePlug compliant system, and a Brazilian Digital Television System (SBTVD) compliant system.

19. The method of claim 8, wherein the plurality of symbols received are transmitted over a channel characterized by a Doppler shift.

20. A non-transitory computer readable media storing instructions that when executed are used to generate a processor adapted to perform blind channel estimation comprising:
receiving a plurality of symbols, wherein each received symbol is associated with a carrier, each received symbol is further associated with a symbol constellation featuring symbol states of constant amplitude and equal phase separation of phi, and wherein each received symbol is characterized by an amplitude component and a phase component;
determining a channel amplitude estimate for each carrier based on the amplitude component of the associated received symbol;
determining a channel phase estimate for each carrier based on the differences between phase components of received symbols associated with adjacent carriers and on a minimum phase difference between any two symbols; and
determining a coarse channel estimate for each carrier, wherein the amplitude of the coarse channel estimate equals the channel phase amplitude estimate for the carrier, and the phase of the coarse channel estimate equals the channel phase estimate for the carrier.

21. The computer readable media of claim 20, wherein the instructions are in a hardware description language (HDL).

22. The computer readable media of claim 20, further comprising filtering a coarse channel estimate to create a fine channel estimate.

23. The computer readable media of claim 22, wherein the filtering includes using a low pass filter.

24. The computer readable media of claim 22, wherein the filtering includes using a minimum mean square error filter.

25. The computer readable media of claim 20, wherein the symbol constellation is a quadrature phase shift keying (QPSK) symbol constellation and phi equals pi divided by 2.

26. The computer readable media of claim 20, wherein the symbol constellation is a differential quadrature phase shift keying (DQPSK) symbol constellation and phi equals pi divided by 2.

27. The computer readable media of claim 20, wherein the symbol constellation is a binary phase shift keying (BPSK) symbol constellation and phi equals pi.

28. The computer readable media of claim 20, wherein the symbol constellation is a n-PSK (phase shift keying) symbol constellation and phi equals 2 times pi divided by n.

29. The computer readable media of claim 20, wherein the symbol constellation is a n-DPSK (differential phase shift keying) symbol constellation and phi equals 2 times pi divided by n.

30. The computer readable media of claim 20, wherein the plurality of symbols received are associated with an orthogonal frequency division multiplexing (OFDM) system.

31. The computer readable media of claim 20, wherein the plurality of symbols received are DQPSK symbols associated with at least one of an Integrated Service Digital Broadcasting-Terrestrial (ISDB-T) compliant system, a Digital Audio Broadcasting (DAB) compliant system, a Digital Multimedia Broadcasting (DMB) compliant system, a HomePlug compliant system, and a Brazilian Digital Television System (SBTVD) compliant system.

32. The computer readable media of claim 20, wherein the plurality of symbols received are transmitted over a channel characterized by a Doppler shift.

33. A receiver apparatus for blind channel estimation, comprising:
means for estimating channel amplitude adapted to receive a plurality of PSK (phase shift keying) or DPSK (differential phase shift keying) modulated symbols, with each received symbol characterized by an amplitude component, a phase component and associated with a carrier, and wherein the means for estimating channel amplitude is configured to output a channel amplitude estimate for each carrier based on the amplitude component of the associated received symbol;
means for estimating channel phase adapted to receive the same plurality of PSK or DPSK modulated symbols received by the means for estimating channel amplitude, and wherein the means for estimating channel phase is configured to output a channel phase estimate for each carrier based on the differences between phase components of received symbols associated with adjacent carriers and on a minimum phase difference between any two PSK or DPSK symbols; and
means for outputting a coarse channel estimate associated with each carrier, wherein the amplitude of the coarse channel estimate equals the channel amplitude estimate for the carrier, and the phase of the coarse channel estimate equals the channel phase estimate for the carrier.

34. The apparatus of claim 33, further comprising means for filtering the coarse channel estimates to output fine channel estimates.

35. The apparatus of claim 33, wherein the plurality of symbols received are associated with an orthogonal frequency division multiplexing (OFDM) system.

36. The apparatus of claim 33, wherein the plurality of symbols received are DQPSK symbols associated with at least one of an Integrated Service Digital Broadcasting-Terrestrial (ISDB-T) compliant system, a Digital Audio Broadcasting (DAB) compliant system, a Digital Multimedia Broadcasting (DMB) compliant system, a HomePlug compliant system, and a Brazilian Digital Television System (SBTVD) compliant system.

37. The apparatus of claim 33, wherein the plurality of symbols received are transmitted over a channel characterized by a Doppler shift.

* * * * *